(12) United States Patent
Sakurai

(10) Patent No.: US 6,419,319 B1
(45) Date of Patent: Jul. 16, 2002

(54) WHEEL DEVICE AND CHAIR EQUIPPED WITH SAME

(75) Inventor: Takumi Sakurai, Shizuoka (JP)

(73) Assignees: Sakurai Hardware Co., Shizuoka; Naigai Co., Ltd., Osaka, both of (JP)

( * ) Notice: Subject to any disclaimer, the term of this patent is extended or adjusted under 35 U.S.C. 154(b) by 0 days.

(21) Appl. No.: 09/425,403

(22) Filed: Oct. 22, 1999

(30) Foreign Application Priority Data

Oct. 23, 1998 (JP) ............................................. 10-302546

(51) Int. Cl.[7] ................................................. A47C 1/12
(52) U.S. Cl. ................................................. 297/344.12
(58) Field of Search ............................ 16/18 R, 19, 45, 16/18 CG; 297/463.1, 344.12, 344.18

(56) References Cited

U.S. PATENT DOCUMENTS

| | | | | |
|---|---|---|---|---|
| 2,533,403 A | * | 12/1950 | Schultz | |
| 3,441,974 A | * | 5/1969 | Dean | |
| 3,719,370 A | * | 3/1973 | Gintick et al. | |
| 3,858,271 A | * | 1/1975 | Howard et al. | |
| 4,649,595 A | * | 3/1987 | Shane | |
| 4,700,430 A | * | 10/1987 | Raftery | |
| 5,001,808 A | * | 3/1991 | Chung | |

FOREIGN PATENT DOCUMENTS

JP          58171703          11/1983          ........... B60B/33/06

* cited by examiner

Primary Examiner—Milton Nelson, Jr.
(74) Attorney, Agent, or Firm—Steinberg & Raskin, P.C.

(57) ABSTRACT

A wheel device and a chair equipped with the same which do not require replacement of a conventional retractable wheel, but instead enable the wheel to be placed in the operating state at all times, as required. The wheel device comprises a wheel and a holder member for holding the wheel. An urging member is arranged between the wheel and the holder member to constantly urge the wheel to be projected in an operable position. A retraction permitting member is adapted to permit the wheel to be retracted while overcoming the urging force of the urging member when a load is exerted in the direction of gravity on a member on which the wheel is mounted. The retraction permitting member includes a setting mechanism for setting the wheel to be in an un-retractable state. The chair is equipped with the wheel devices mounted to a leg portion thereof.

32 Claims, 14 Drawing Sheets

FIG. 1A
FIG. 1B
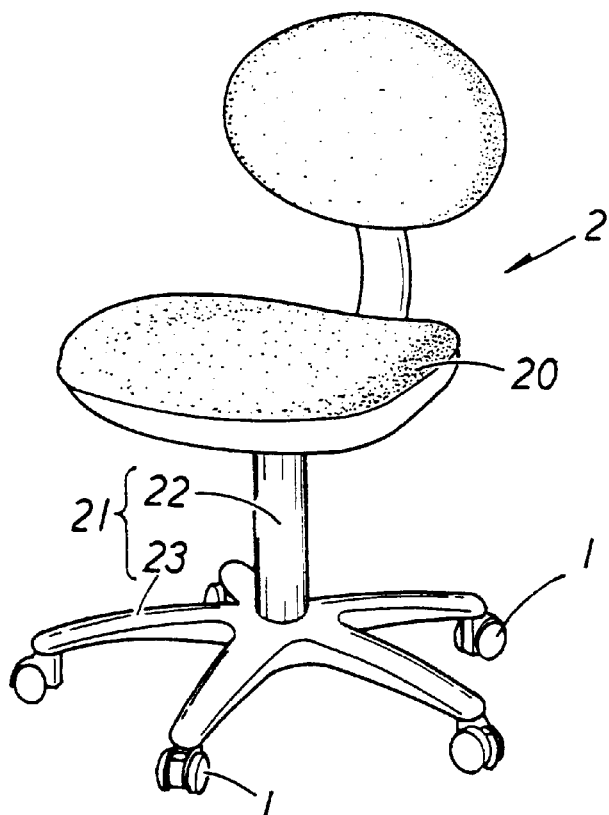
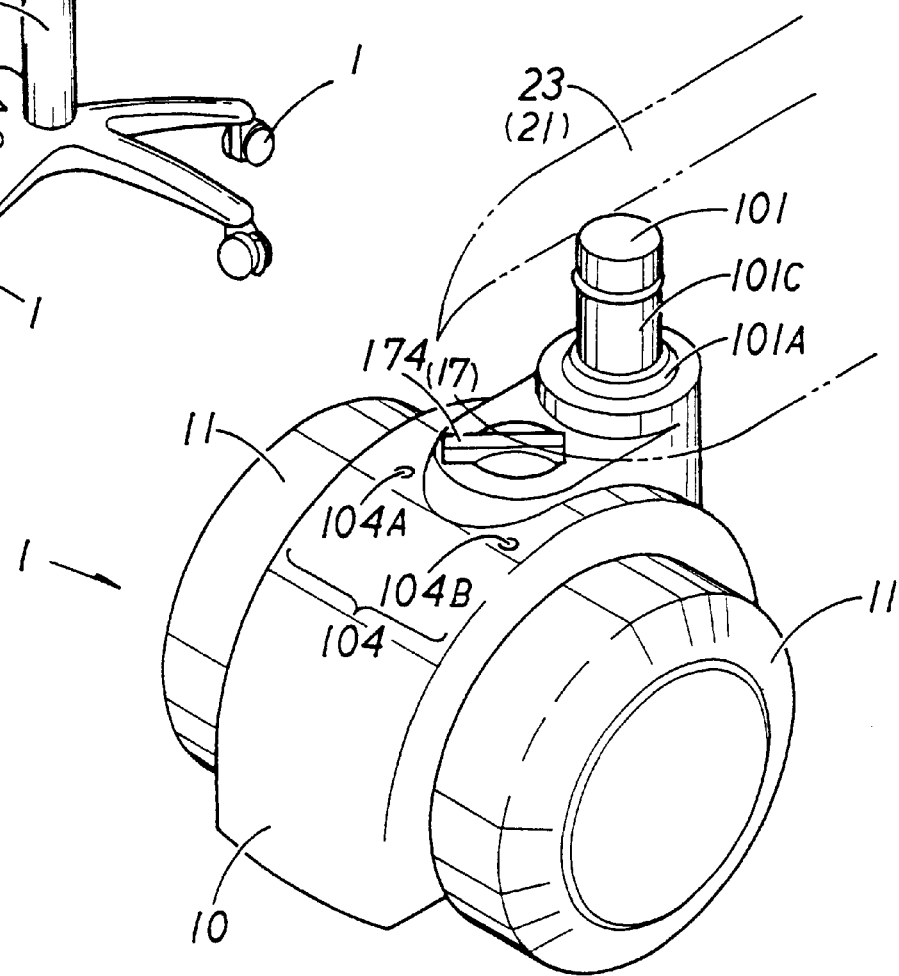

FIG. 3A
FIG. 3B
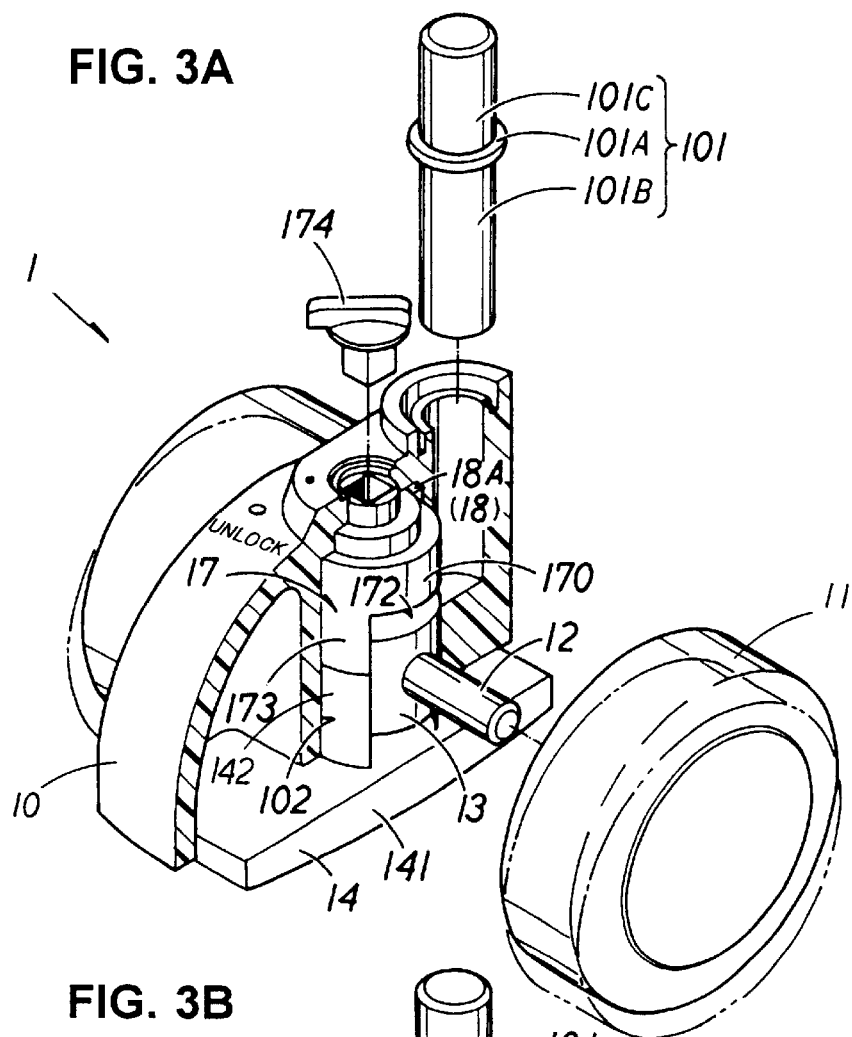
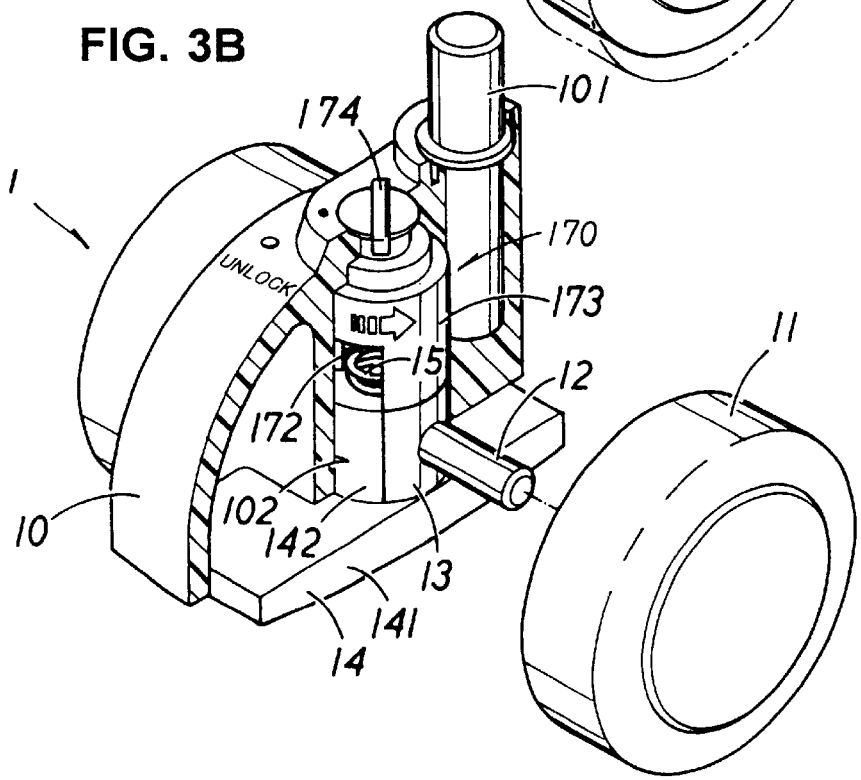

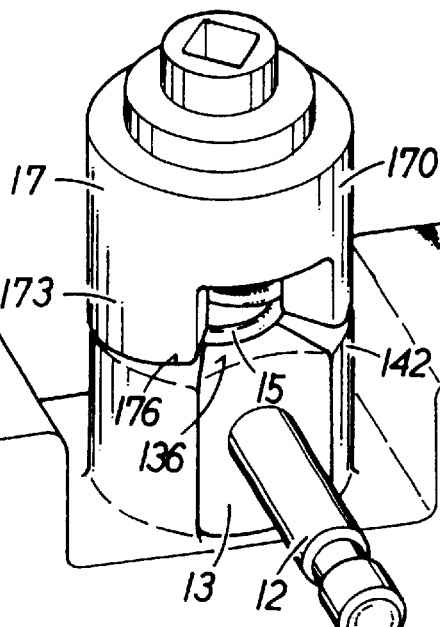
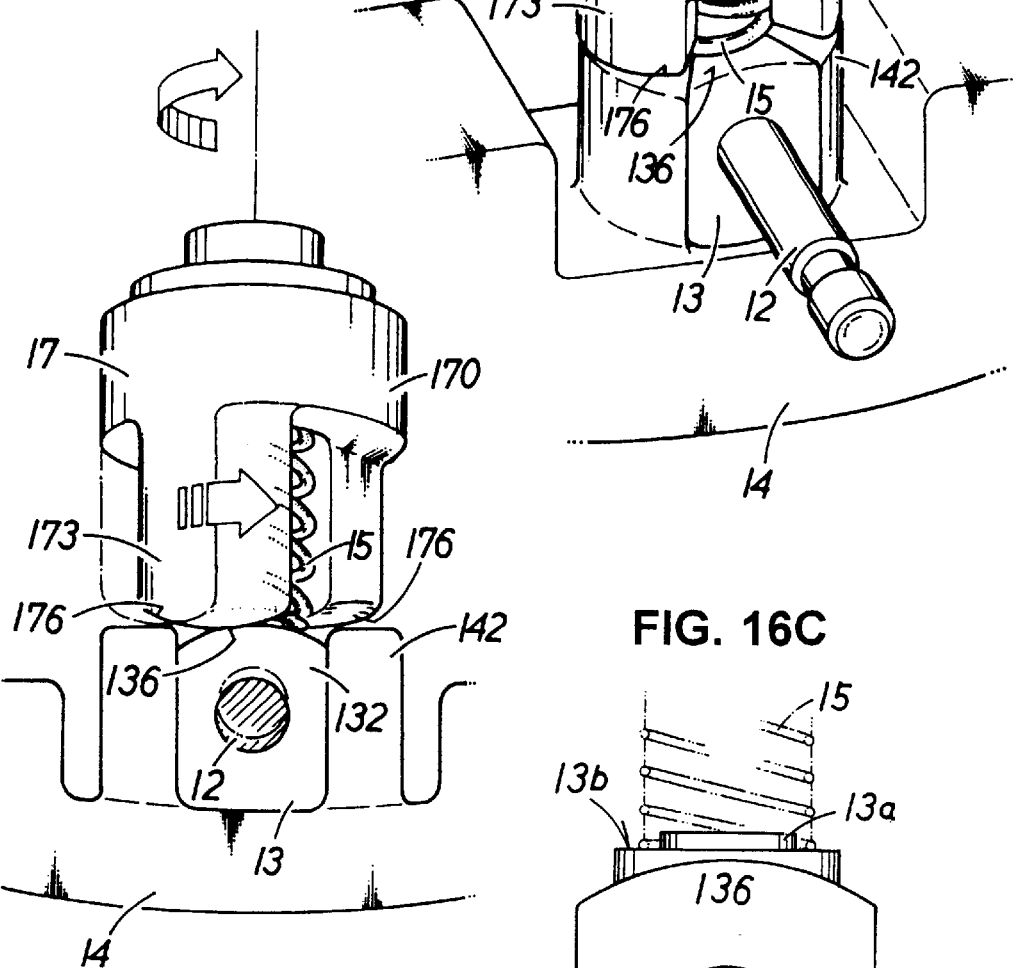
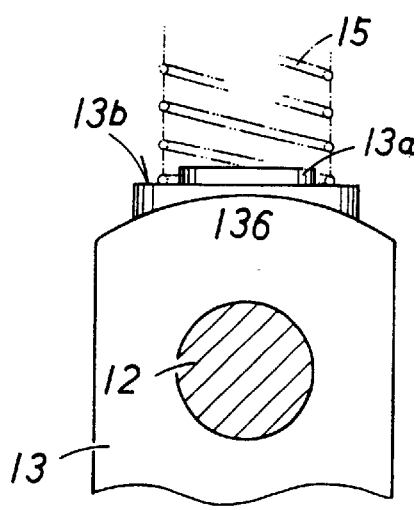

WHEEL DEVICE AND CHAIR EQUIPPED WITH SAME

BACKGROUND OF THE INVENTION

The present invention relates to a wheel device adapted to chairs and a chair equipped with the same. More particularly, the invention relates to a wheel device of the type in which a wheel operates under the no-load condition and retracts under the loaded condition, wherein the wheel is capable of being kept from retracting as required even under the loaded condition, and a chair to which such a wheel device is attached.

There has heretofore been placed in the market a chair for school children, in which wheel devices are attached to the lower ends of legs of the chair so that the chair can be easily moved and that the wheels retract relative to the legs when the chair has received the load due to sitting so as to prevent the wheels from working, to thereby enable school children of a relatively lower age to use the chair with safety.

The chair of this type features its convenience and has been favorably accepted in the market. As the children who are the users grow up, however, the following demands must be satisfied. For children grown up to the upper grades in school, the chair that moves on wheels while carrying a child sitting on it no longer causes danger, or the chair can be safely used by a child himself or herself. Rather, it is requested that the user be permitted to move within distances of a short range while sitting thereon. To comply with this request, the purchasers buy for their children who have grown up a new chair equipped with universal casters which are operable at all times.

In this case, however, it does not mean that the chairs used when the children were in the lower grades in school are no longer usable; i.e., adjustment of the height of the seat level permits the chairs to be used by the children who have grown up. Therefore, simply purchasing the new chairs for convenience is a wasteful expenditure. Attempts have been made to use the chair purchased when the child was of a lower age even after the child has grown up instead of buying a new one. This attempt is commercially accomplished by a chair in which fixed ground pieces and casters are replaceably attached to the lower ends of the legs of the chair so that the fixed ground pieces are attached to the lower ends of the legs for use when a child is in the lower grades in school, and that the fixed ground pieces are removed and, instead, the casters are attached when the child has grown up to the upper grades in school, whereby he or she is allowed to move over narrow distances while sitting thereon.

According to this construction, however, the chair is used without the wheel device when the child is in the lower grades in school. Except when the child is sitting, therefore, this chair is inconvenient such as when it is to be moved. In addition, the replacement operation is cumbersome. More than that, the fixed ground pieces are replaced by the casters in many cases after the chair has been used for two or three years. Therefore, the user must store the casters for years and it often happens that the casters are missing by the time when they are to be used. If the casters capable of solving such problems were developed, they can be used not only for the chairs for school children but also for chairs for persons who need care taking, chairs for use in offices and the like. In this respect, therefore it has been urged to positively solve the above-mentioned problems.

SUMMARY OF THE INVENTION

The present invention has been made in view of such circumstances. Accordingly, it is an object of the present invention to provide a novel wheel device which enables a wheel to operate at all times as required without replacement of a conventional retractable wheel device, and a novel chair equipped with such a wheel device.

In accordance with one aspect of the present invention, a wheel device is provided. The wheel device includes a wheel having an axle, a holder member for holding the wheel, an urging member, arranged between the wheel and the holder member, for constantly urging the wheel to be projected in an operable position, and a retraction permitting member adapted to permit the wheel to be retracted while overcoming the urging force of the urging member when a load is exerted in the direction of gravity on a member on which the wheel is mounted. The retraction permitting member includes a setting mechanism for setting the wheel to be in a retraction blocked state.

According to this invention, even a retractable wheel can be used so as to select the state of blocking the retraction in which the wheel is forcibly maintained to work.

In a preferred embodiment of the present invention, the holder member includes a bearing that directly supports the axle of the wheel and a casing that supports the bearing.

According to this embodiment of the invention, the holder member is constituted of the bearing and the casing for supporting the bearing. Therefore, a conventional most typical design structure can be utilized, and the wheel can be smoothly moved in a vertical direction.

In a preferred embodiment of the present invention, the holder member is mounted in the form of a universal caster on the member on which the wheel is mounted.

According to this embodiment of the invention, since the holder member is a so-called universal caster, the direction of movement is not limited.

In a preferred embodiment of the present invention, the urging member is directly disposed between the bearing and casing or substantially between the bearing and casing while another member is interposed between the bearing and casing.

According to this embodiment of the invention, a conventional most typical design structure can also be utilized.

In a preferred embodiment of the present invention, the setting mechanism includes a setting piece that acts on the bearing for the wheel so as to set between a state for permitting the retraction of the bearing and a state for blocking the retraction of the bearing, depending on the attitude of the setting piece which is set.

According to this embodiment of the invention, even a retractable wheel can be used so as to select the state for blocking the retraction in which the wheel is forcibly maintained to work.

In a preferred embodiment of the present invention, the setting piece in the setting mechanism is provided on the casing above the bearing in a manner to be rotatable about a rotational axis perpendicular to the axle, and the setting piece is provided with a retraction permission recess and a retraction blocking protrusion in portions on a side thereof adjacent to the bearing, whereby the setting piece is turned to change over the setting attitude thereof so that either the retraction permission recess or the retraction blocking protrusion is made face the upper side of the bearing.

According to this embodiment of invention, such a construction which is a so-called bayonet mechanism permits the retraction blocked state or retraction permitted state of the wheel to be selected by turning the setting piece.

In a preferred embodiment of the present invention, the setting mechanism includes a turn range-setting mechanism provided on slide surfaces of the casing and setting piece to more reliably set the retraction permitted state and the retraction blocked state.

According to this embodiment of the invention, the retraction permitted state and the retraction blocked state of the bearing can be reliably and easily changed over.

In a preferred embodiment of the present invention, the angle for turning the setting piece is 90 degrees.

According to this embodiment of the invention, the setting piece is turned 90 degrees in the bayonet-like structure to select the retraction blocked state or the retraction permitted state of the wheel.

In a preferred embodiment of the present invention, at least one of the retraction blocking protrusion of the setting piece and the bearing that comes into contact with the retraction blocking protrusion is provided with a change-over guide portion so that the setting piece is allowed to smoothly turn even in a state where the bearing is slightly entering into the retraction permission recess of the setting piece.

According to this embodiment of the invention, the setting piece can be smoothly turned even in a state where the wheel is sinking to some extent due to the own weight of the chair, i.e., even in a state-where the axle is entering to some extent into the retraction permission recess.

In a preferred embodiment of the present invention, a bearing surface and a protuberance are formed on the change-over guide portion of the bearing for stably supporting the urging member.

According to this embodiment of the invention, the urging member can be stably supported even when the urging member has moved to some extent with the turn of the setting piece.

In a preferred embodiment of the present invention, the setting piece includes a shift piece mounted on an upper end thereof at a position above the casing.

According to this embodiment of the invention, the retraction permitted state and the retraction blocked state of the wheel can be selectively and easily changed over by operating the shift piece.

In accordance with another aspect of the present invention, a chair is provided. The chair includes a seat portion, a leg portion and wheel devices constructed as described above and mounted to a lower end of the leg portion. The wheel devices are set to be in an operating state under the no-load condition, and are selectively set to be in either a non-operating state or an operating state under the loaded condition.

When the chair having such construction is used by a school child in the lower grades in school for whom safety must be maintained while he or she is sitting on it, the wheels are retracted so as to prevent the chair from being inadvertently moved. When the child grows up to the upper grades in school and the chair that moves to some extent may no longer cause danger, the chair may be so used that the wheels are maintained to work at all times.

BRIEF DESCRIPTION OF THE DRAWINGS

FIG. 1A is a perspective view showing an embodiment of a chair equipped with wheel devices according to the present invention;

FIG. 1B is a perspective view showing an embodiment of the wheel device of the present invention;

FIG. 3A is a perspective view illustrating, in cross section, some parts of the wheel device in a disassembled manner, when the wheel device is in the retraction permitted state;

FIG. 3B is a perspective view illustrating the wheel device in the retraction blocked state;

FIGS. 16A to 16C are diagrams illustrating the state of a change-over guide portion in the setting mechanism in the wheel device of the present invention;

DESCRIPTION OF THE PREFERRED EMBODIMENTS

Figure 2:
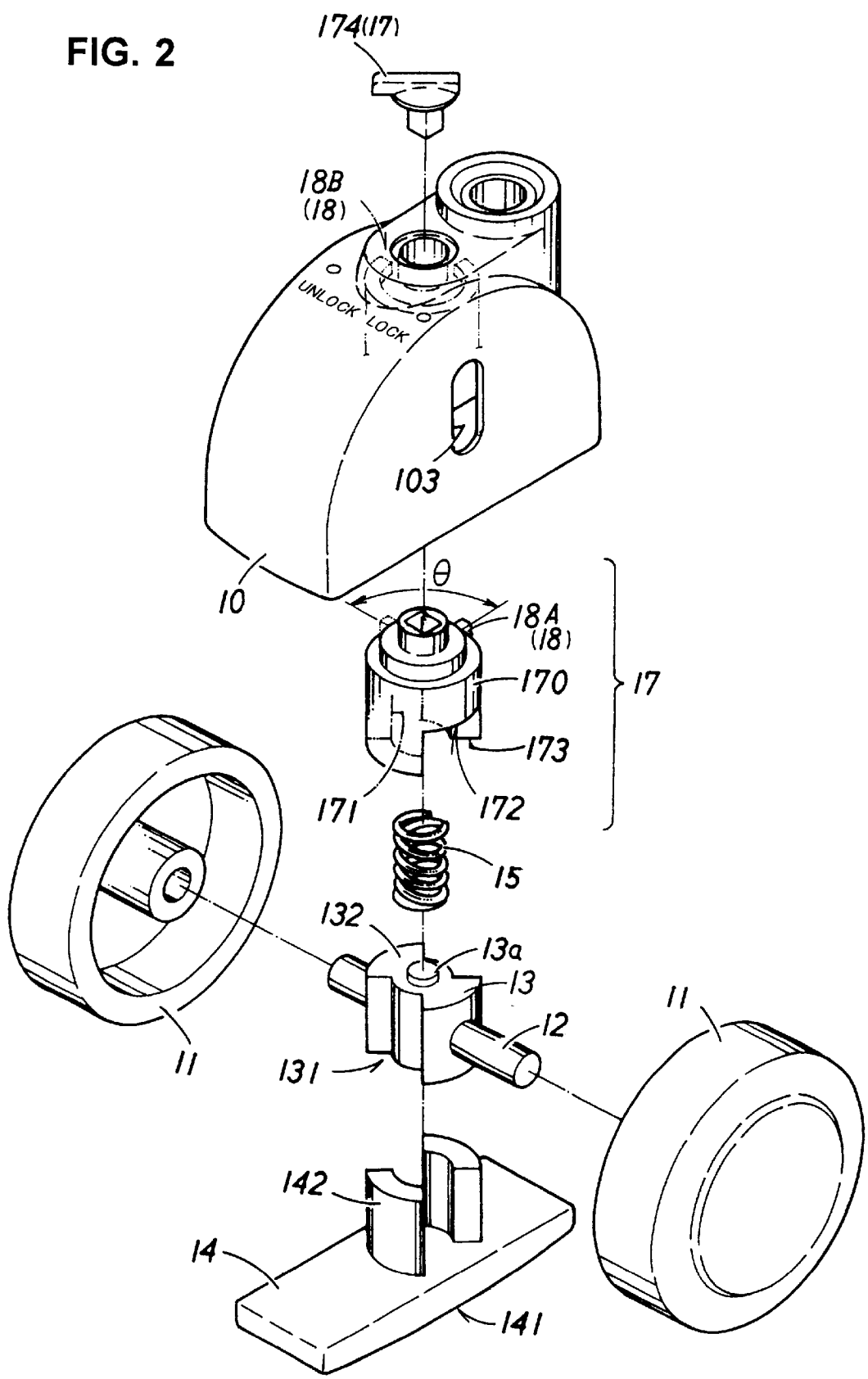
FIG. 2 is an exploded perspective view illustrating the wheel device shown in FIG. 1B.
Figure 4:
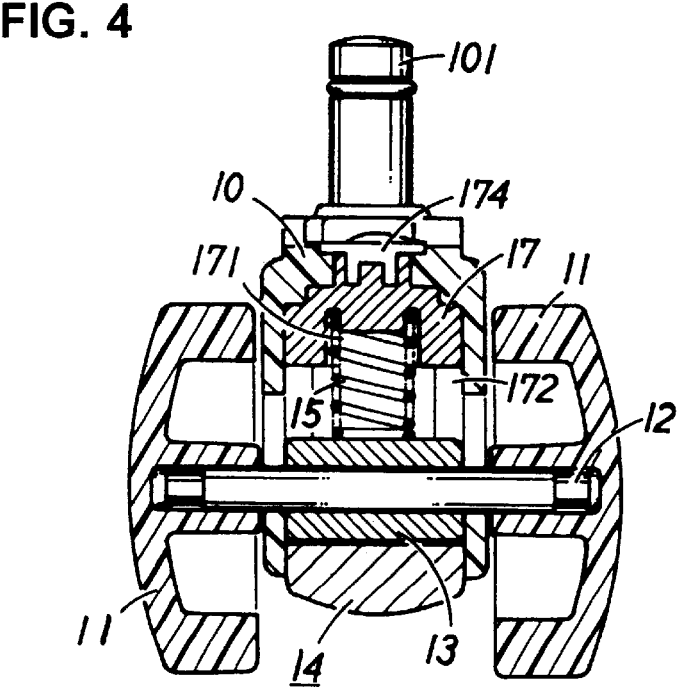
FIG. 4 is a vertical sectional view showing the wheel device when it is viewed from the front central direction.
Figure 5:
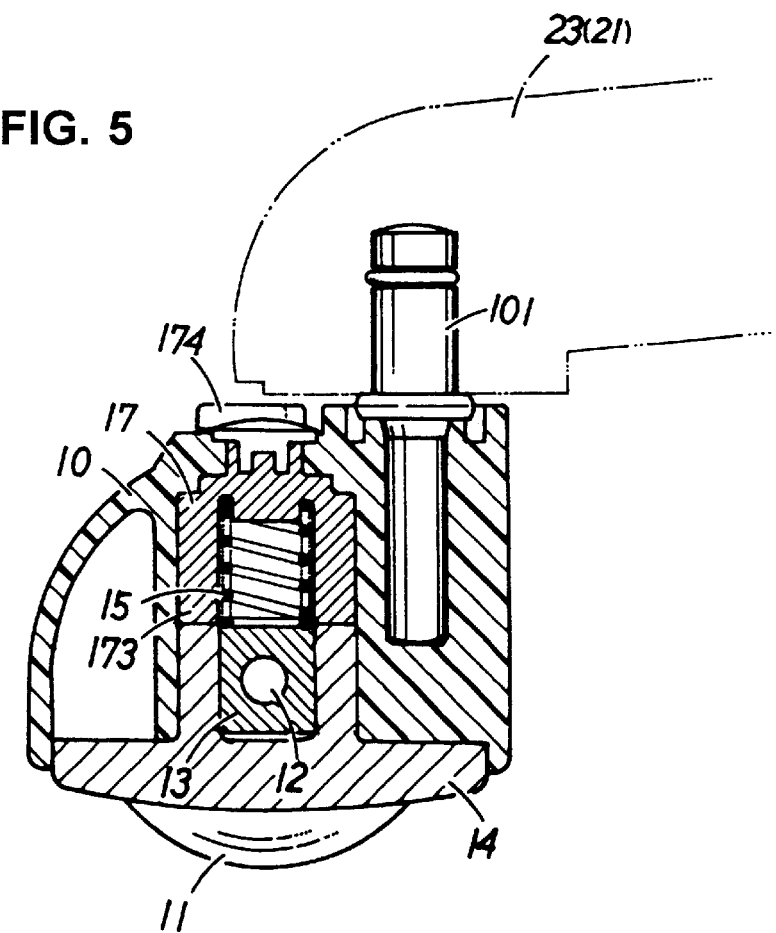
FIG. 5 is a vertical sectional view showing the wheel device.

The present invention will now be described by way of diagramed embodiments with reference to FIG. 1A to FIG. 19B, wherein like reference numerals designate like or corresponding parts throughout.

FIG. 1A illustrates an embodiment of a chair 2 equipped with wheel devices 1 according to the present invention. It will be noted that the member on which the wheels are mounted referred to in the claims stands for the chair 2 as a whole or a leg portion 21 of the chair 2 to which the wheels are directly attached. More particularly, the chair 2 is mainly constituted of a seat portion 20 and the leg portion 21, the seat portion 20 being mounted on the leg portion so as to freely rotate with respect to the leg portion 21. The leg portion 21 includes a post 22 that rises vertically to directly support the seat portion 20, and, for example, five extended legs 23 on the lower part thereof. The wheel devices 1 of one embodiment of the present invention are attached, for example, in the form of universal casters to the lower surfaces at the ends of the extended legs 23.

The most preferred embodiment of the wheel device of the present invention will now be described with reference to FIGS. 1B to 5. As described above, the wheel device 1 is of the type of a universal caster, and the wheel 11 is of the type of double wheels attached on both sides with respect to a casing 10. First, the casing 10 is formed by injection-molding a synthetic resin or the like and is a narrow and flat hollow member. The holder member for the wheels 11 referred to in the claims substantially stands for the casing 10 or the one that includes the casing 10 and a bearing 13 that will be described later or a holder member shown in FIGS. 12A to 12C merged with some of the leg portion 21 as will be described later.

The casing 10 has a caster pin 101 vertically raised at a position near one end thereof in the back-and-forth direction. To meet the requirement of strength, it is desirable that the caster pin 101 have a metal member press fitted therein. More specifically, the caster pin 101 has a flange portion 101A at the central portion thereof, a casing insertion portion 101B formed in the lower portion thereof, and a chair-side insertion portion in the upper portion thereof.

The casing 10 is substantially hollow on the inside thereof to form a bearing-receiving portion 102, and has slit-like axle guide holes 103 formed in the sides thereof in the vertical direction. The wheels 11 are supported by the casing 10. More particularly, the wheels 11 are supported by the casing 10 through an axle 12 penetrating through both of the right and left wheels 11 and a bearing 13 supporting the axle 12 at the central portion thereof. The bearing 13 has nearly a rectangular shape in cross section as viewed from the side, and has sectors each having a center angle of 90 degrees and being laterally expanded from opposite sides of the central circular portion as viewed on a plane. That is, the bearing 13 has clearance portions 131 for retraction along the side peripheries thereof, and has extended portions 132 for blocking the retraction. Corresponding to the constitution of the slit-like axle guide holes 103, the bearing 13 together with the wheels 11 is attached to the casing 10 so as to move up and down. In the rotation permitted state of the wheels 11, the wheels 11 and the axle 12 are integral together, whereas the rotation is permitted between the axle 12 and the bearing 13.

A skid piece 14 is fitted in the casing 10 under the bearing 13. The skid piece 14 prevents the end of the casing 10 and the like from coming into direct contact with the floor surface or the like when the wheels 11 are retracted, and enables smooth slide. The skid piece 14 has a smooth lower surface formed to have a partial spherical shape serving as a skid portion 141, and has an engaging portion 142 at an upper portion thereof so as to be fitted in the casing 10 while keeping away from the bearing 13.

A setting spring 15 is provided above the axle 12 and constitutes the urging member that is referred to in the claims to constantly urge the bearing 13 downward. The setting spring 15 in this embodiment is a coil spring which comes at its lower end in contact with the upper surface of the bearing 13 and is supported at its upper end by the casing 10 serving as a fixing member. In this embodiment, however, the setting spring 15 is not in direct contact with the casing 10, but instead is in contact with a setting piece 170 in a setting mechanism 17 which is one of the major structures of the present invention. As will be described later, the setting piece 170 is turned. If the end of the setting spring 15 is left as it is cut, a sharp edge thereof may bite into the setting piece 170 when it is turned, leading to impairing the smooth turn. It is therefore desirable that at least the end (upper end) of the setting spring 15 on the side adjacent to the setting piece 170 be bent inward and downward so as not to create the above-mentioned problem. It is further considered that with the turn of the setting piece 170, the setting spring 15 may laterally move to some extent. It is therefore desirable that a protuberance 13a be also formed on the upper surface of the bearing 13 to restrict the position of the setting spring 15 and to stably hold it.

The setting mechanism 17 will now be described in detail. The setting mechanism 17 includes a setting piece 170 mounted in the casing 10 above the bearing 13 in a manner to be rotatable about a rotational axis extending in a vertical direction. The setting piece 170 is provided with a spring-receiving portion 171 for receiving the setting spring 15 formed in the central portion thereof, and the lower portion thereof is formed in the shape of a fork so that the setting piece 170 further has retraction permission recesses 172 which are cut-away portions and retraction blocking protrusions 173 having a relatively protruded shape. The retraction permission recesses 172 and the retraction blocking protrusions 173 are alternately formed at angular pitches of 90 degrees in the direction of turn of the setting piece 170.

The rotational angle of 90 degrees was selected to be the optimum angle by taking into consideration easy use and shapes of parts. However, what is important is that in setting the retraction blocking state and the retraction permission state of the wheels 11, the above two states can be set by turning the setting piece 170 in a certain angle in relation to the bearing 13. Therefore, the design can be suitably changed to select the two states by a 45 degrees turn or to select the two states by a 180 degrees turn, etc. The retraction permission recesses 172 have the size large enough for the bearing 13 to be retracted.

It is desirable that the following constitution be employed between the retraction blocking protrusions 173 in the setting piece 170 and the retraction blocking extended portions 132 in the bearing 13. Though the operation state between the two will be described later, the setting spring 15 in the wheel device 1 is slightly compressed in a state of receiving the own weight of the chair 2 and, hence, the bearing 13 slightly enters into the retraction permission recesses 172 of the setting piece 170. Even when it is attempted to turn the setting piece 170 in this case, the turn of the setting piece 170 is blocked by the bearing 13. As shown in FIGS. 16A to 16C, therefore, the corners of each retraction blocking protrusion 173 of the setting piece 170 and the corners of each extended portion 132 of the bearing 13 which comes into contact with the retraction blocking protrusion 173 are rounded and are used as a change-over guide portion 136 in the bearing 13 and as a change-over guide portion 176 in the setting piece 170. The change-over guide portions 136 and 176 may be formed on either the bearing 13 or the setting piece 170, or may be formed on both of them as in the illustrated embodiment. When the smooth rounded change-over guide portion 136 is formed on the bearing 13, the contacting surface for the setting spring 15 is also rounded. It is therefore desirable that a nearly horizontal surface 13b be positively provided around the periphery of the protuberance 13a as shown on an enlarged scale in FIG. 16C in order to more stably support the setting spring 15.

The upper end of the setting piece 170 is arranged so as to be exposed through an opening at the upper end of the casing 10, and a shift piece 174 is attached to the upper end thereof. As will be described later in detail, the shift piece 174 functions to select the retraction permission state and the retraction blocking state upon changing the attitude of the setting piece 170 by 90 degrees. Change-over indications 104 for indicating such positions are formed on the casing 10. In this embodiment, a change-over indication 104A or "UNLOCK" indicates the retraction permission state and a change-over indication 104B or "LOCK" indicates the retraction blocking state. It is possible to employ other suitable indications, for example, the change-over indication 104A as "OFF" to represent the retraction permission state and the change-over indication 104B as "ON" to represent the retraction blocking state. Instead of providing the above-mentioned shift piece 174, a shift groove 174b such as an engagement groove for a plus or minus screw driver D, a groove for a coin (see FIGS. 6 and 15A to 15C), or the like may be formed in the setting piece 170 at a position where it is directly exposed to outside, so that the setting piece 170 can be turned.

In operating the shift piece 174, further, it is desirable that a turn range-setting mechanism 18 be formed on the setting piece 170 and on the casing 10, so that the position of the change-over indication 104A or 104B is correctly selected, and that the shift piece 174 is not set at an intermediate position. As an example, the turn range-setting mechanism 18 is formed on both slide surfaces of the setting piece 170 and the casing 10 as shown in FIG. 2. More specifically, the range-setting mechanism 18 includes a turn range-setting protuberance 18A formed on the slide portion of the setting piece 170 and a turn range-setting recess 18B formed by cutting in an arcuate form about one-fourth turn so that the turn range-setting protuberance 18A is allowed to turn in the casing 10 through an angular range θ, i.e., only 90 degrees, to accomplish the reliable change-over operation. Alternatively, a position guide mechanism such as click-stop mechanism or the like may be provided between the shift piece 174 and the casing 10.

The above-mentioned embodiment of FIGS. 1A to 5 has dealt with the wheel device of the type of double wheels having wheels 11 attached to both sides of the bearing 13. The wheel device, however, may be of the single wheel type having a single wheel 11 attached to the central portion of the bearing 13. The wheel 11 is a narrow cylindrical member that comes in line contact with the floor surface. Not being limited thereto only, however, the wheel 11 may be a ball member that comes in a point contact.

The wheel device 1 according to the preferred embodiment of the present invention has construction as concretely described above. To attach the wheel devices 1 to the chair 2 which is a member on which the wheel devices 1 are to be mounted, the caster pin 101 is inserted in the lower end of the extended leg 23 of the chair 2 so as to be secured therein. When the chair 2 is used in this state, the wheel device 1 works in a manner as described below.

(1) Use in the Retraction Permission State

In this case, first, an end of the shift piece 174 attached to the setting piece 170 constituting the setting mechanism 17 is set to the unlocking side of the change-over indication 104, i.e., set to the change-over indication 104A which is "UNLOCK". Then, as shown in FIG. 3A, the retraction permission recesses 172 in the setting piece 170 are set in a direction along the axle 12, whereas the retraction blocking protrusions 173 are located at positions deviated from the bearing 13 in the back-and-forth direction with the bearing 13 sandwiched therebetween. In such a state, the bearing 13 supporting the axle 12 is allowed to retract upward against the setting spring 15 since a space sufficient for retraction has been maintained above the bearing 13. When nobody is sitting on the chair 2, therefore, the wheels 11 are urged downward by the setting spring 15, the whole chair 2 is permitted to be moved while the wheels 11 are in contact with the floor. When a person sits on the chair, the wheels 11 are deviated upward against the setting spring 15 due to the load from the upper side. Accordingly, the skid piece 14 comes in contact with the floor together with the wheels 11.

(2) Setting to the Non-retracting State

Next, to set to the non-retracting state, the shift piece 174 is turned 90 degrees to the "LOCK" (104B) in the change-over indication 104. Due to this operation, the setting piece 170 integral with the shift piece 174 changes its attitude by 90 degrees, and the retraction blocking protrusions 173 of the setting piece 170 come in contact with just the top of the upper portion of the bearing 13. Therefore, the bearing 13 is blocked by the retraction blocking protrusions 173 from moving upward, and the wheels 11 are set to be maintained in a protruded state at all times. Then, irrespective of whether a person is sitting on the chair 2 or not, the wheels 11 are maintained protruded so as to work (see FIG. 3B).

(3) Action of the Change-over Guide Portion

In turning the setting piece 170, provision of the change-over guide portions 136 and 176 makes it possible to smoothly turn the setting piece 170 even in a state where the wheels 11 are slightly retracted due to, for example, the own weight of the chair 2 or even in a state where the bearing 13 is entering to some extent in the retraction permission recesses 172 of the setting piece 170. That is, despite the bearing 13 is entering to some extent into the retraction permission recesses 172 in the setting piece 170, the smooth rounded surfaces of the change-over guide portions 136 and 176 permit the change-over guide portions 136 and 176 to be abut against each other, to thereby enable them to smoothly turn as shown in FIGS. 16A to 16C. In addition, upon forming the substantially horizontal bearing surface 13b and the protuberance 13a on the change-over guide portion 136 of the bearing 13, the setting spring 15 is supported more stably even when the setting spring 15 is moved to some extent with the turn of the setting piece 170.

In the foregoing was described the construction of the wheel device 1 and the chair 2 equipped with the same according to a preferred embodiment of the invention. The invention, however, can be realized in manners of the following embodiments.

(1) Wheel Device

Figure 6:
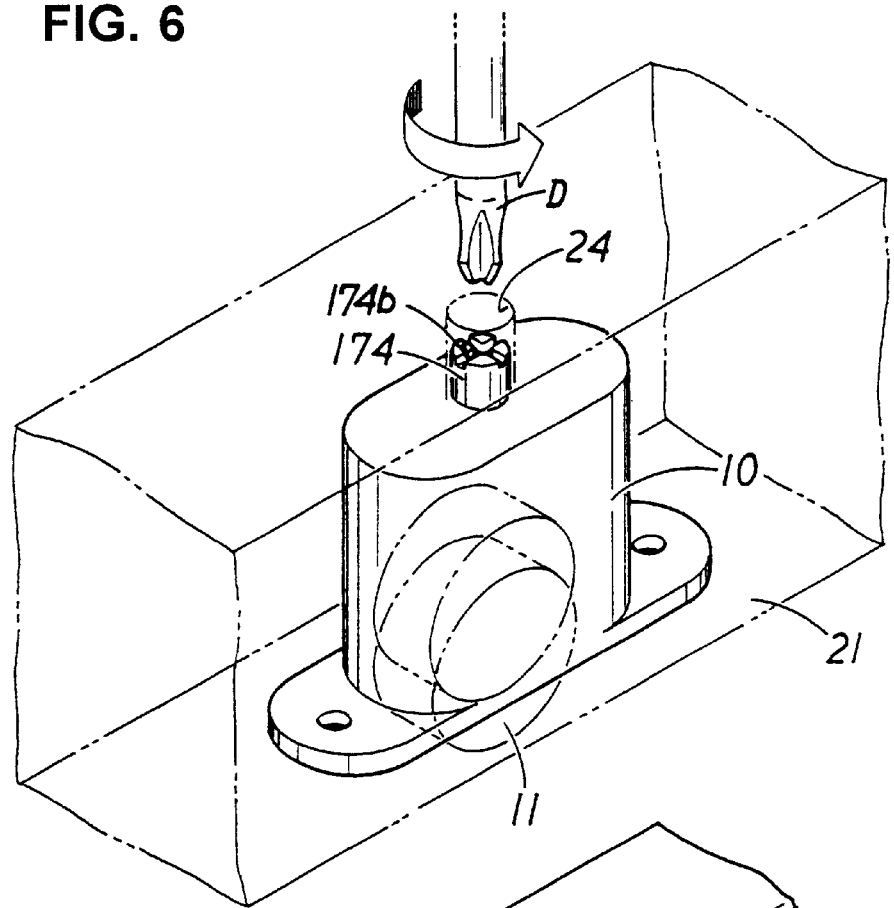
FIG. 6 is a perspective view illustrating another embodiment of the wheel device according to the present invention, which wheel device is of the router hole-fitted type.

FIG. 6 shows a router hole-fitted type fixed caster to which the present invention is adapted. For instance, a fitting groove is formed by a router in a leg portion 21 or the like of a wooden chair 2, and a wheel device is fitted therein. In this case, as schematically shown, a setting mechanism (not shown) which is similar to that of the above described embodiment is provided between a casing 10 and a bearing (not shown) so that a wheel 11 is set not to retract at all times. In this instance, for example, when a setting piece (not shown) constituting the setting mechanism is to be turned from the upper side, an operation hole 4 is pierced in the leg portion 21 of the chair, and a screw driver D or the like is fitted into the shift groove 174b in the shift piece 174 connected to the setting piece to turn it.

Figure 7:
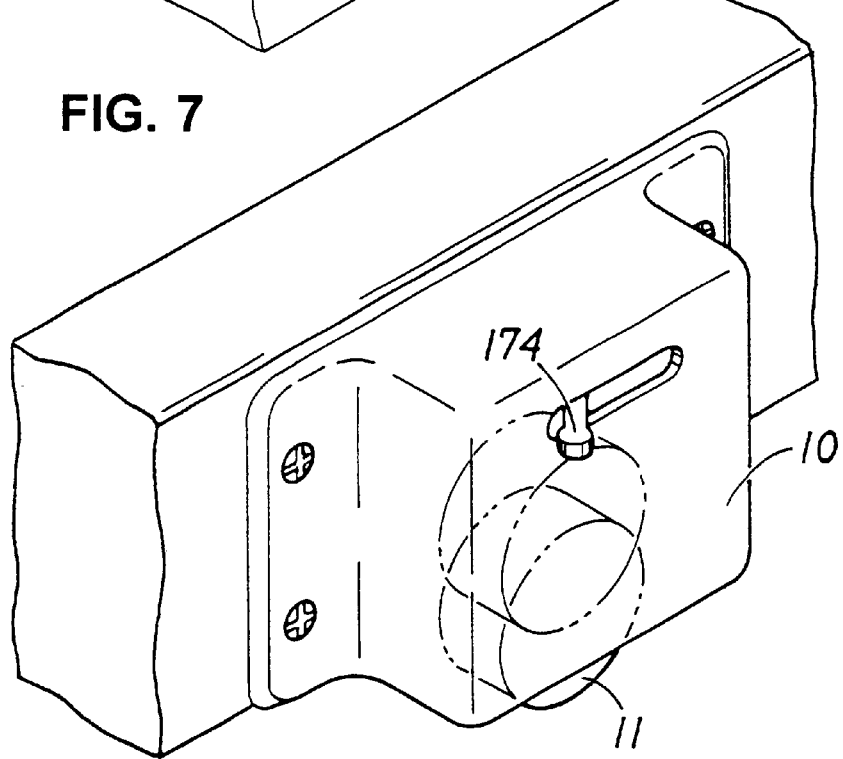
FIG. 7 is a perspective view illustrating a further embodiment of the wheel device according to the present invention, which wheel device is of the side-attached type.

According to an embodiment shown in FIG. 7, the present invention is adapted to a caster of the so-called side-attached type. Though not described in detail, a setting mechanism (not shown) can be provided between a casing 10 and a bearing (not shown) supporting an axle (not shown) of a wheel 11 like in the above-mentioned embodiment. In the wheel device of the side-attached type and in the wheel device 1 of the above-mentioned first embodiment (shown in FIGS. 1A to 5), the setting piece 170 of the setting mechanism 17 may be turned by using the shift piece 174 extending sideward as shown in FIG. 7. Though the setting mechanism is not shown in FIGS. 6 and 7, the one concretely illustrated with reference to FIGS. 1A to 5 or the one shown in FIG. 8 that will be described later, can be used for the embodiments of FIGS. 6 and 7.

Figure 8:
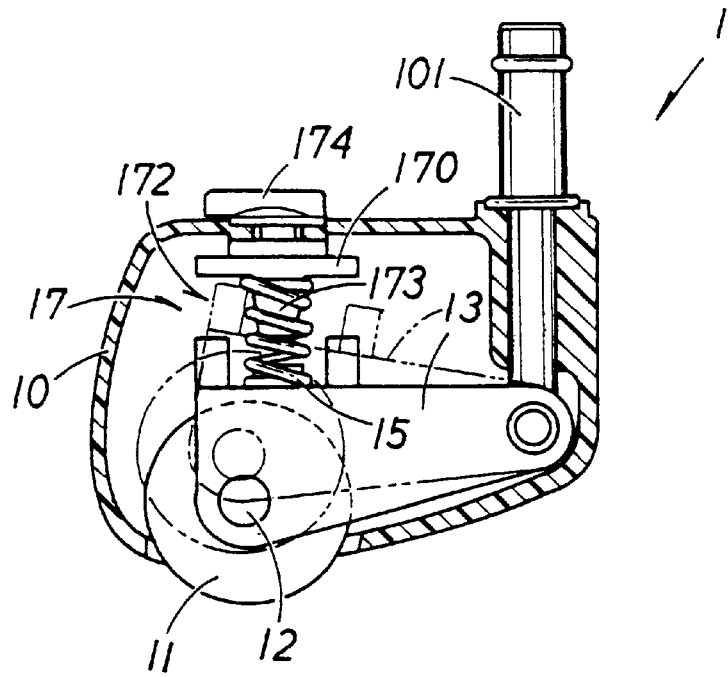
FIG. 8 is a vertical sectional view illustrating a still further embodiment of the wheel device according to the present invention, in which wheel device the wheel swings.
Figure 9:
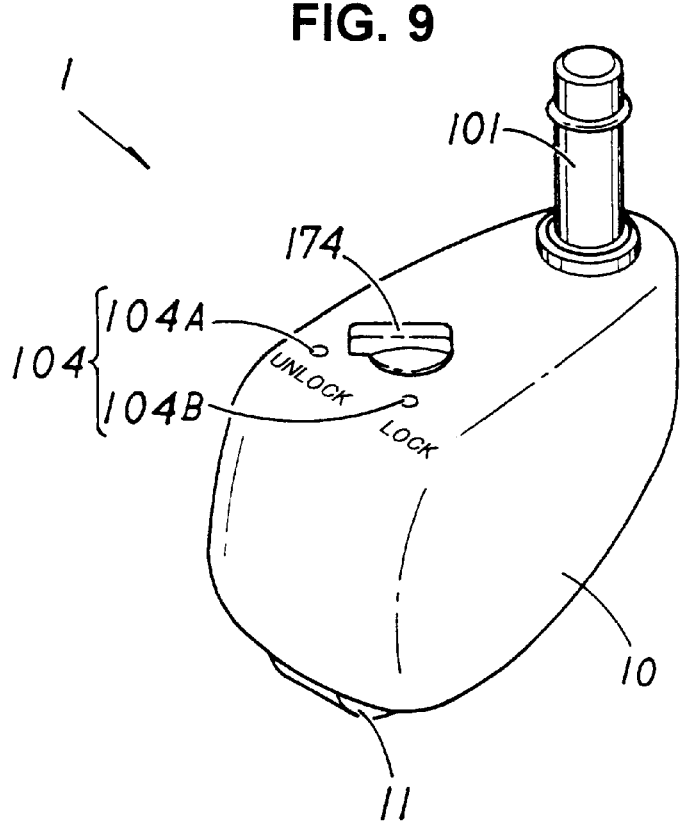
FIG. 9 is a perspective view illustrating the appearance wheel device shown in FIG. 8.
Figure 10:
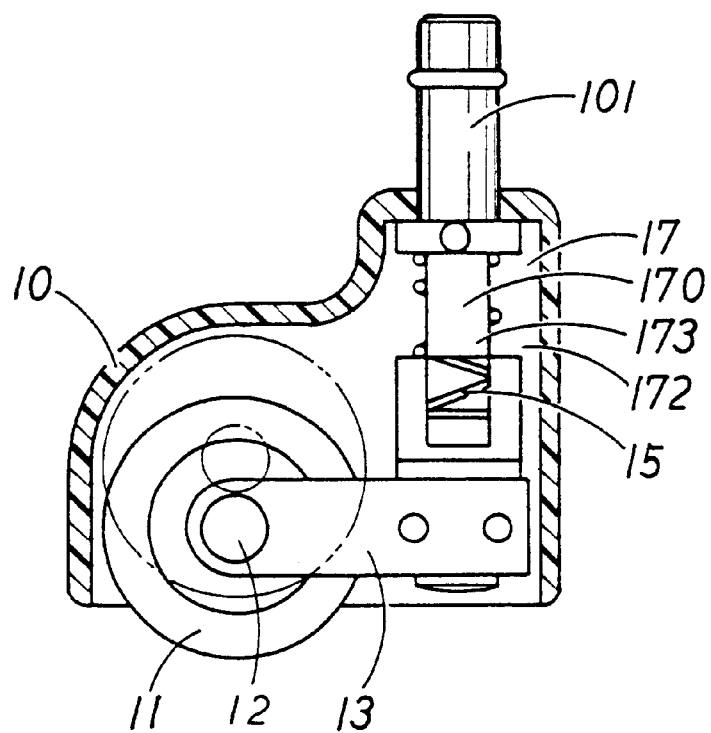
FIG. 10 is a vertical sectional view illustrating a yet further embodiment of the wheel device according to the present invention, which wheel device includes the structure which vertically moves along a caster pin.
Figure 11:
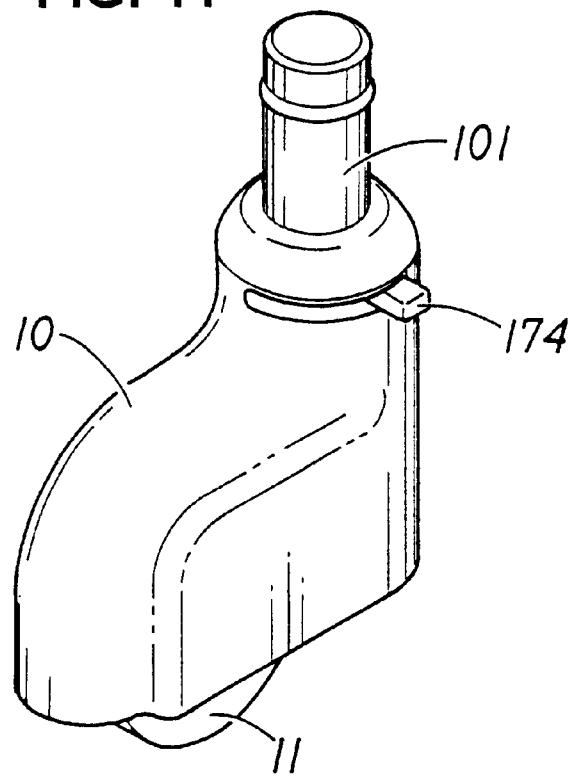
FIG. 11 is a perspective view illustrating the appearance of the wheel device shown in FIG. 10.

Moreover, in a wheel device 1 of the universal caster type shown in, for example, FIGS. 8 and 9, when a wheel 11 is supported by a swing arm-like bearing 13, a setting mechanism 17 may be provided above the bearing 13 at its free end. FIGS. 10 and 11 illustrate a wheel device 1 of the universal caster type in which a setting spring 15 for vertically moving a wheel 11 is provided around a caster pin 101. In this case, a setting piece 170 of a setting mechanism 17 is turned like a bayonet to select the retraction permitted state and the retraction blocked state.

Figure 12A:
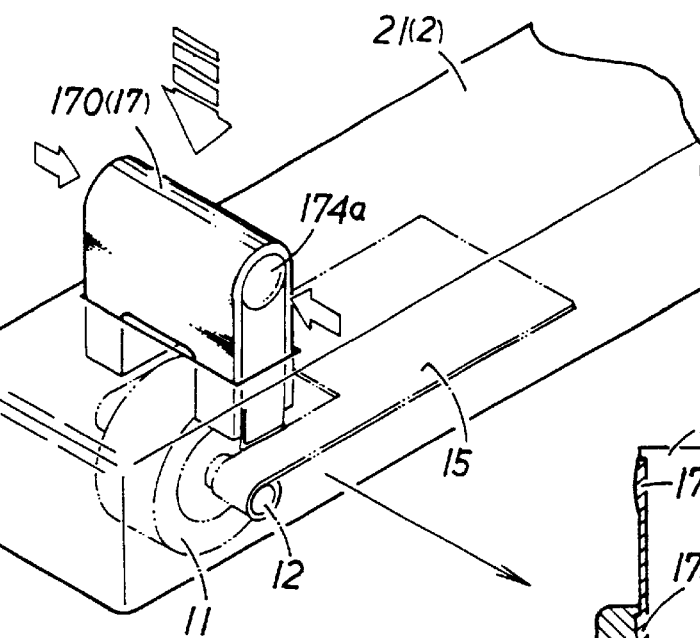
FIG. 12A is a perspective view illustrating a further embodiment of the wheel device according to the present invention.
Figure 12B:
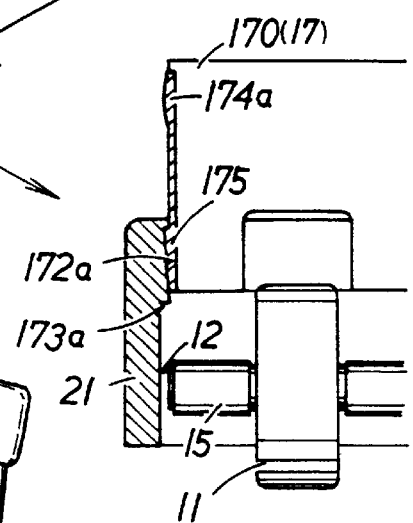
FIG. 12B is a partly enlarged elevational view in section, showing the wheel device of FIG. 12A.
Figure 12C:
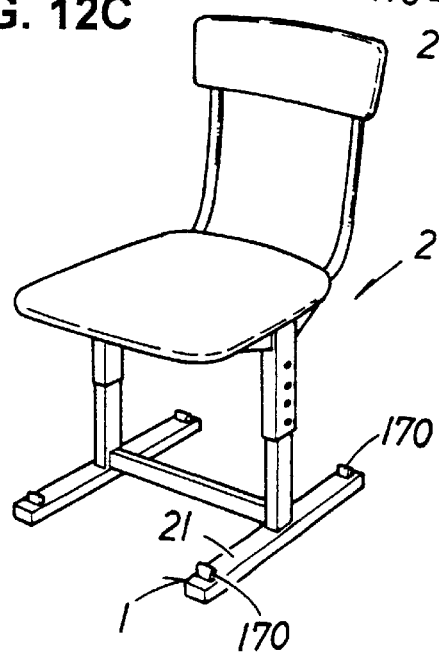
FIG. 12C is a perspective view illustrating the appearance of the chair in which the wheel devices of FIG. 12A are incorporated.

In the above-mentioned embodiments, the setting spring 15 acting as the urging member is in the form of a coil spring and is set right above the wheel or wheels 11, and is kept in contact with the bearing 13. However, the setting spring 15 serving as the urging member may be a Leaf spring in order to directly support the axle 12 as shown in FIGS. 12A to 12C. In this embodiment, the holder member for holding the wheel 11 stands for the leg portion 21 of the chair 2, since the leg portion 21 exhibits the action of holding. In this embodiment, the setting mechanism 17 of the above-mentioned type can be used though this embodiment which utilizes engagement of the form of an inverted pawl which is another type.

Figure 17:
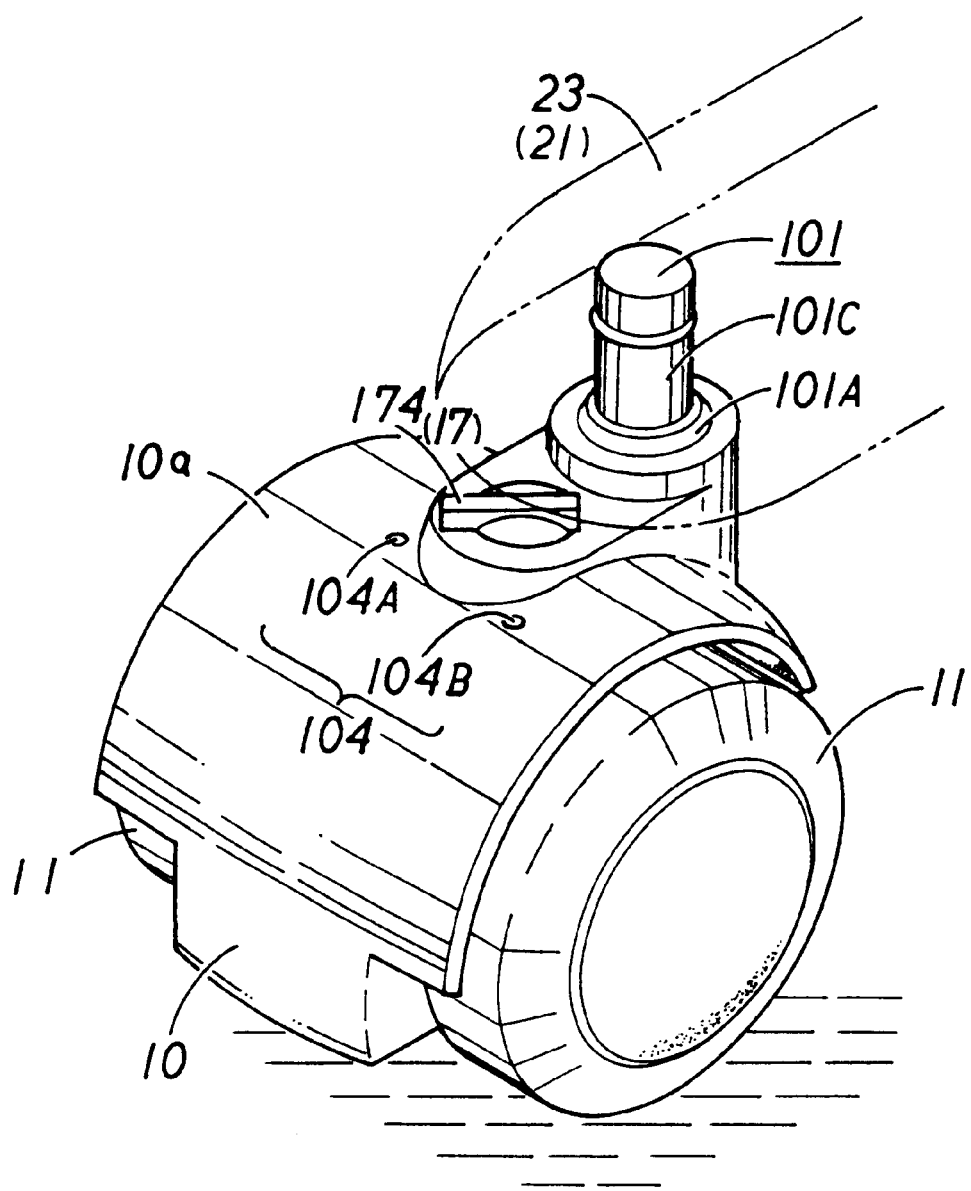
FIG. 17 is a perspective view illustrating the wheel device equipped with a wheel cover.
Figures 18A, 18B:
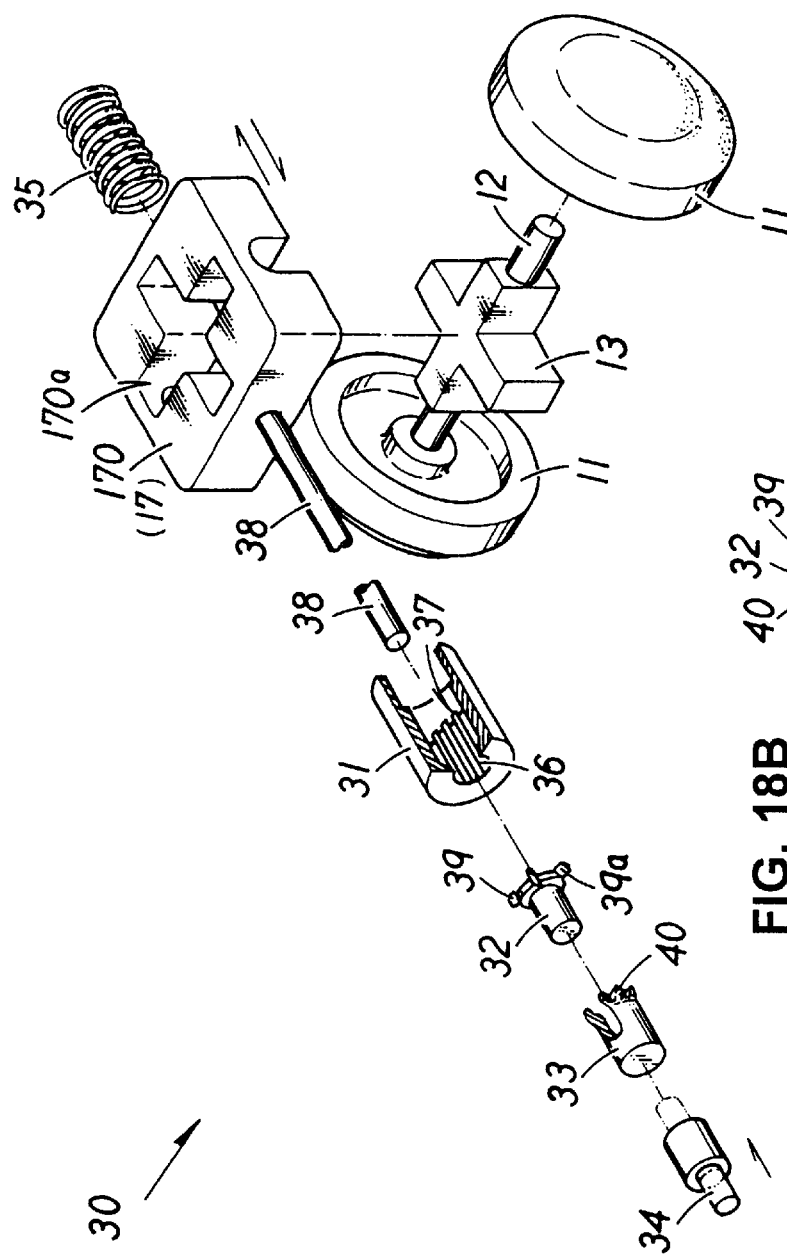
FIG. 18A is an exploded perspective view illustrating an embodiment of a slide setting mechanism for changing over the retraction permitted state and the retraction blocked state by sliding a setting piece.
FIG. 18B is a sectional view showing an essential part of the slide setting mechanism of FIG. 18A.

In an embodiment shown in FIG. 17, the wheels 11 are covered by neither the casing 10 nor the leg portion 21 of the chair 2 but are exposed to outside. In this case, a wheel cover 10a is provided to extend substantially halfway around the wheels 11 in the casing 10. When a person who sits is a young child, this construction effectively prevents the cloths or toes from being inadvertently caught by the wheels 11.

(2) Setting Mechanism

Figure 13:
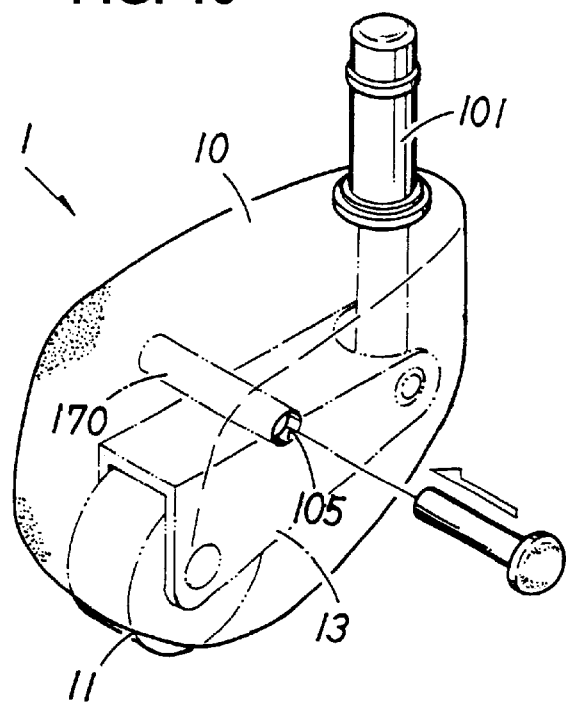
FIG. 13 is a perspective view illustrating a setting mechanism in another embodiment of the wheel device according to the present invention.
Figure 14:
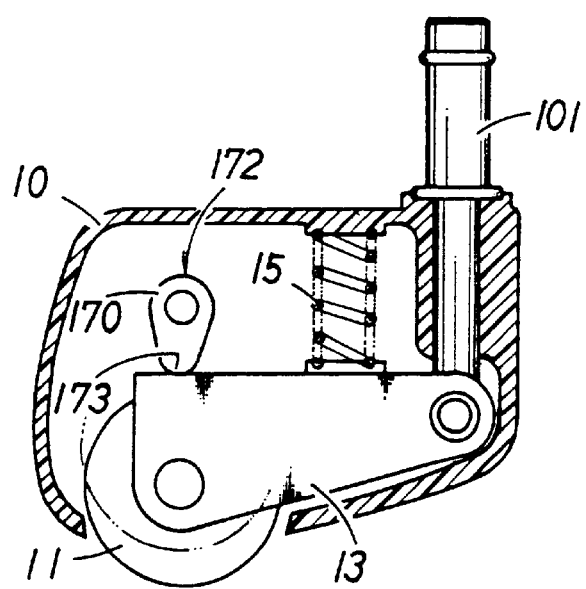
FIG. 14 is a vertical sectional view illustrating a setting mechanism in a further embodiment of the wheel device according to the present invention.

The setting mechanism can be realized in other forms. In the above-mentioned embodiment, the setting piece 170 acts like the so-called bayonet to select the retraction permitted state or the retraction blocked state. In effect, the wheel(s) 11 may be blocked from being retracted upward. Therefore, various other embodiments can be employed in addition to the embodiments described above. That is, the setting mechanism is shown in FIG. 13 is relatively simple, wherein a setting piece 170 which is a pin for blocking the swinging of a bearing 13 is inserted like a bar through a hole 105 in the side of a casing 10 to prevent the retraction. Such a mechanism can be adapted to the fixed caster of the so-called side-attached type shown in FIG. 7 as well as to the casters of any other type. An embodiment shown in FIG. 14 employs a cam which is used as a setting piece 170. The protruded portion or apex of the cam serves as the retraction blocking protrusion 173 and the land portion other than the apex of the cam serves as the retraction permitting recess 172.

Further, described below is the setting mechanism 17 of the embodiment in which the axle 12 is directly supported by the setting spring 15 as shown in FIG. 12 and described above. In this embodiment, a setting piece 170 is inserted in the leg portion 21 of the chair 2 from the upper side, which leg portion 21 serves as a holder member. Then, as shown on an enlarged scale in FIG. 12B, a retraction permission recess 172a of the shape of an inverted pawl and a retraction block protrusion 173a are formed in two steps in the vertical direction on the inner side wall of the leg portion 21 that serves as the holder member. A pair of engaging pawls 175 of the shape of an inverted pawl are formed on the opposite side portions of the setting piece 170, so that the depressed position of the setting piece 170 can be set in two upper and lower stages.

In a state where the setting piece 170 is pushed down, the lower surface of the setting piece 170 urges, from the upper side, the setting spring 15 positioned right on the axle 12, so that the setting piece 170 stays at the position where the engaging pawls 175 and the retraction blocking protrusions 173a are brought into engagement together, whereby the wheel 11 is forcibly set in a state of being protruded. To unlock this state, shift buttons 174a are depressed to release the engagement between the engaging pawls 175 and the retraction blocking protrusions 173a so as to pull the setting piece 170 up.

In the embodiment of FIGS. 1A to 5 described above, the setting piece 170 is turned a predetermined angle to select the retraction permission state or the retraction blocking state. According to the setting mechanism 17 of an embodiment shown in FIGS. 18A and 18B, a setting piece 170 is slid back and forth a predetermined distance. That is, a bearing 13 for directly supporting an axle 12 is formed in a crossing manner as viewed on a plane. Correspondingly, a reception groove 170a is formed in the setting piece 170 so that the bearing 13 can be fitted therein, whereby the setting piece 170 is slid to select the retraction permitted state or the retraction blocked state. In this case, the position at which the receiving groove 170a of the setting piece 170 is matched with the bearing 13, creates the retraction permitted state and the position at which they are deviated relative to each other creates the retraction blocked state.

To slide the setting piece 170, a so-called knock-type slide-setting mechanism 30 is used. As shown, for example, in FIGS. 18A and 18B, this mechanism 30 includes a guide portion 31 that is fixed to a casing (not shown) on the operation side of the setting piece 170, a position-setting piece 32 fitted into the guide portion 31, a knock piece 33 for pushing the position-setting piece 32, a push button 34 for directly pushing the knock piece 33, and a return spring 35 for urging the setting piece 170 at all times on the non-operation side of the setting piece 170. The guide portion 31 is hollow, has splines 36 formed in the inner peripheral surface thereof, and has a receiving portion 37 formed on the surface on the non-operation side, i.e., on the fore side in the depressing direction, wherein every other splines 36 having dissimilar lengths. The position-setting piece 32 is fitted in the guide portion 31 so as to turn a predetermined angle only when it is disengaged from the splines 36. The position-setting piece 32 is rotatably supported by a rod 38 or the like so as to maintain a predetermined distance from the setting piece 170. The position-setting piece 32 has, for example, four engaging protrusions 39 formed on the rear side in the depressing direction to come into engagement with the receiving portion 37. Each of the engaging protrusions 39 has an inclined surface 39a inclined in one direction at an end thereof on the operation side. The knock piece 33 is mounted so as to cover the position-setting piece 32, and has pushing portions 40 which have sharp ends and which are formed on the peripheral surface on the fore side in the depressing direction so as to push the engaging protrusions 39.

Such a knock-type slide-setting mechanism has been widely employed for a variety of switches and writing utensils, and the manner of operation thereof will be briefly described below. First, when the push button 34 is depressed, the pushing portions 40 of the knock piece 33 come into contact with the respective inclined surfaces 39a of the engaging protrusions 39 of the position-setting piece 32. As the push button 34 is further depressed, the engaging protrusions 39 are guided by the splines 36 formed in the inner peripheral surface of the guide portion 31, and the position setting piece 32 moves in the depressing direction. When the ends of the splines 36 are reached, the engagement is no longer maintained. As the push button 34 is further depressed, the position-setting piece 32 is turned the predetermined angle along the inclined surfaces 39a of the engaging protrusions 39 and is slightly moved in the depressing direction. The rotational angle in this case is set to a pitch of the splines 36. Due to the force of the return spring 35, the engaging protrusions 39 come into contact with the receiving portion 37 on the next splines 36. After every depression of the push button 34, the position-setting piece 32 is turned by one pitch of splines 36. The setting piece 170 slides back and forth depending on the length of the receiving portions 37 of the splines 36, and comes into a halt at a respective one of positions in the back-and-forth direction.

Figure 15A:
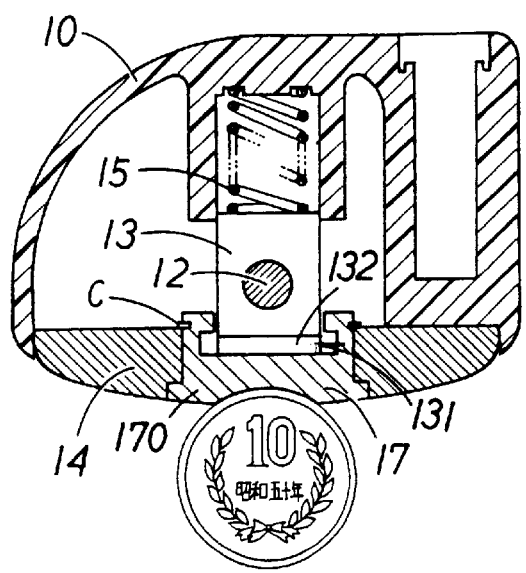
FIGS. 15A to 15C are vertical sectional views illustrating a setting mechanism in a still further embodiment of the wheel device according to the present invention.
Figure 15B:
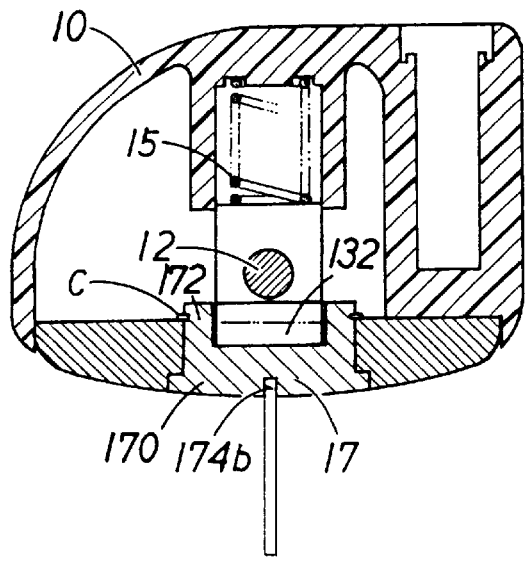
Figure 15C:
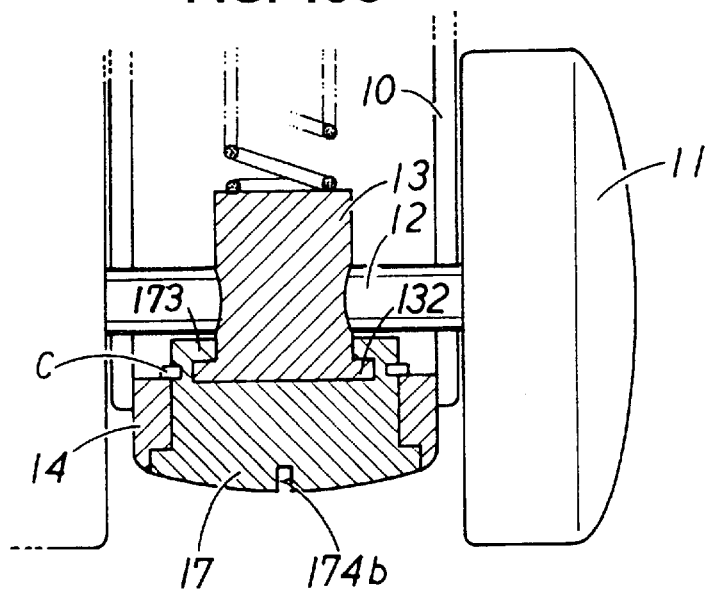

The setting mechanism 17 may be further constituted in a manner as shown in FIGS. 15A to 15C. The feature in this case is that the setting mechanism 17 can be operated from the lower side of the casing 10. That is, the bearing 13 of the wheels 11 is provided with a pair of extended portions 132 formed to oppositely protrude therefrom and a pair of clearance portions 131 formed at positions where the extended portions 132 do not exist. On the other hand, the setting piece 170 is rotatably attached to, for example, the skid piece 14 under the bearing 13 by using a clip C or the like. On the upper part of the setting piece 170 are formed the retraction blocking protrusions 173 extending like pawls facing inward to each other so as to engage with the extended portions 132 of the bearing 13. Further, the portions where the retraction block protrusions 173 do not exist are used as retraction permission recesses 172. The state where the wheels 11 accompanying the axle 12 can be retracted upward or not, is set depending upon whether the extended portions 132 of the bearing 13 are engaged with the retraction blocking protrusions 173 of the setting piece 170. In this embodiment, the setting piece 170 is turned by using a shift groove 174b in which a coin can be inserted.

(3) Retracted State

Figure 19A:
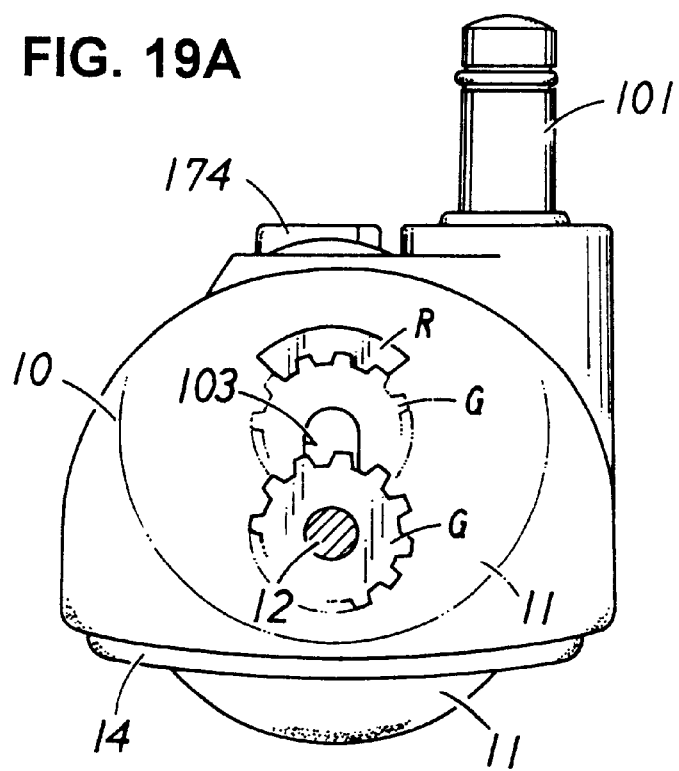
FIGS. 19A and 19B each are a diagram illustrating another embodiment of the wheel device which directly prevents the turn of the wheel in the retracted state.
Figure 19B:
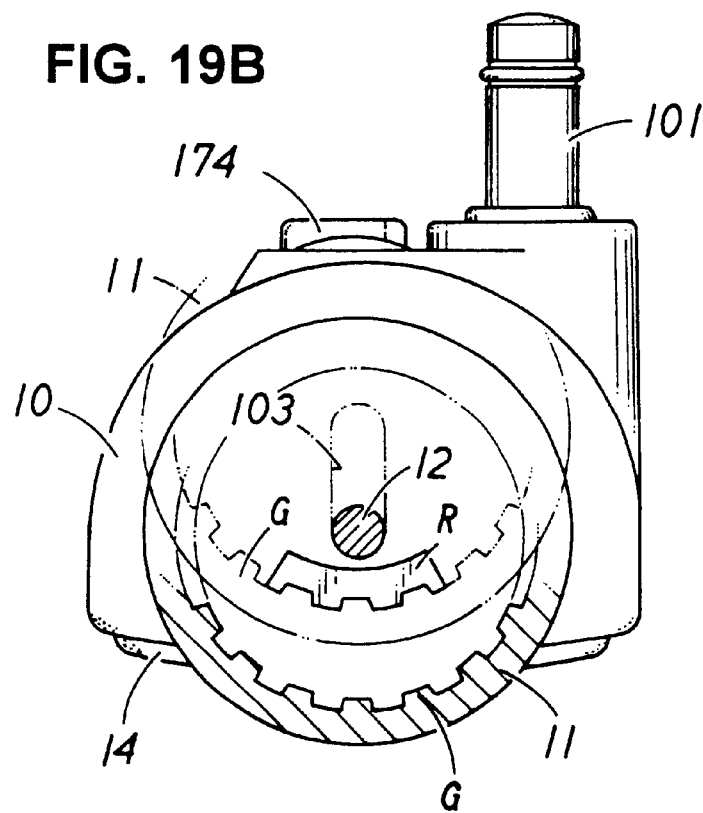

Described below is a further embodiment which permits the wheel device 1 to be retracted. In the above-mentioned embodiment of FIGS. 1A to 5, the retracted state of the wheel device is set so that the wheel device 1 is retracted against the urging member such as the setting spring 15 or the like and the wheels 11 are allowed to freely rotate. It is, however, also allowable to employ a known structure disclosed in, for example, Japanese Utility Model Application Laid-Open Publication No. 171703/1983 entitled "Wheel Device for Legs of Chair". That is, as shown in FIG. 19A, a gear G is formed on the inside of the wheel 11, whereas a rack R is formed near the upper end of an axle guide hole 103 of a casing 10 to mesh with the gear G. In the retracted state, the gear G is meshed with the rack R to directly prevent the turn of the wheel 11. Alternatively, a stopper mechanism may be such that the gear G is formed on the whole inner circumference of the wheel 11 and the rack R is formed near the lower end of the axle guide hole 103 of the casing 10 to mesh with the gear G as shown in FIG. 19B.

(4) Chair

The chair 2 of the present invention is equipped with the wheel devices 1 described above with reference to FIGS. 1A to 5, or with the wheel devices 1 according to other embodiments described above with reference to FIGS. 6 to 19B.

According to the present invention which has the technical features as described above, even the retractable wheel device can be set to the retracted state or to the retraction blocking state. Further, the chair equipped with the wheel devices according to the present invention meets a wide range of uses or demands as well as ensures safety.

While preferred embodiments of the present invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A wheel device comprising:
   a wheel having an axle;
   a holder member for holding said wheel;
   an urging member, arranged between said wheel and said holder member, for constantly urging said wheel to be projected in an operable position;
   a retraction permitting member adapted to permit said wheel to be automatically retracted when a load sufficient to overcome the urging force of said urging member is exerted in the direction of gravity on a member on which said wheel is mounted;
   said retraction permitting member including a setting mechanism for setting said wheel to be in a retraction blocked state; and
   wherein the holder member includes a bearing that supports the axle of the wheel and a casing that supports the bearing; and
   wherein the setting mechanism is arranged within the casing and is operatively associated with the bearing so as to act on the bearing to set the wheel to be in the retraction blocked state.

2. A wheel device as defined in claim 1, wherein said holder member is mounted in the form of a universal caster on the member on which the wheel is mounted.

3. A wheel device as defined in claim 1, wherein said bearing of said holder member directly supports said axle of said wheel.

4. A wheel device as defined in claim 3, wherein said holder member is mounted in the form of a universal caster on the member on which the wheel is mounted.

5. A wheel device as defined in claim 4, wherein said urging member is disposed between said bearing and casing.

6. A wheel device as defined in claim 3, wherein said urging member is disposed between said bearing and casing.

7. A wheel device as defined in claim 3, wherein said setting mechanism includes a setting piece that acts on said bearing for said wheel so as to set between a state for permitting a retraction of said bearing and a state for blocking the retraction of said bearing.

8. A wheel device as defined in claim 7, wherein said setting piece in said setting mechanism is structured and arranged to be rotatable about a rotational axis perpendicular to said axle; and said setting piece is provided with a retraction permission recess and a retraction blocking protrusion in portions on a side thereof adjacent to said bearing;

whereby said setting piece is turned to change a setting thereof so that one of said retraction permission recess and said retraction blocking protrusion is made to face the upper side of said bearing.

9. A wheel device as defined in claim 8, wherein said setting piece includes a shift piece mounted on an upper end thereof at a position above said casing.

10. A wheel device as defined in claim 8, wherein said setting mechanism includes a turn range-setting mechanism provided on slide surfaces of said casing and setting piece to more reliably set the retraction permitted state and the retraction blocked state.

11. A wheel device as defined in claim 10, wherein at least one of said retraction blocking protrusion of said setting piece and said bearing that comes into contact with said retraction blocking protrusion is provided with a change-over guide portion so that said setting piece is allowed to smoothly turn even in a state where said bearing is slightly entering into said retraction permission recess of said setting piece.

12. A wheel device as defined in claim 8, wherein the angle for turning said setting piece is 90 degrees.

13. A wheel device as defined in claim 12, wherein at least one of said retraction blocking protrusion of said setting piece and said bearing that comes into contact with said retraction blocking protrusion is provided with a change-over guide portion so that said setting piece is allowed to smoothly turn even in a state where said bearing is slightly entering into said retraction permission recess of said setting piece.

14. A wheel device as defined in claim 12, wherein said setting piece includes a shift piece mounted on an upper end thereof at a position above said casing.

15. A wheel device as defined in claim 7, wherein said setting mechanism includes a turn range-setting mechanism provided on slide surfaces of said casing and setting piece to more reliably set the retraction permitted state and the retraction blocked state.

16. A wheel device as defined in claim 15, wherein the angle for turning said setting piece is 90 degrees.

17. A wheel device as defined in claim 15, wherein said setting piece includes a shift piece mounted on an upper end thereof at a position above said casing.

18. A wheel device as defined in claim 8, wherein at least one of said retraction blocking protrusion of said setting piece and said bearing that comes into contact with said retraction blocking protrusion is provided with a change-over guide portion so that said setting piece is allowed to smoothly turn even in a state where said bearing is slightly entering into said retraction permission recess of said setting piece.

19. A wheel device as defined in claim 18, wherein a bearing surface and a protuberance are formed on said change-over guide portion of said bearing for stably supporting said urging member.

20. A wheel device as defined in claim 19, wherein said setting piece includes a shift piece mounted on an upper end thereof at a position above said casing.

21. A wheel device as defined in claim 18, wherein said setting piece includes a shift piece mounted on an upper end thereof at a position above said casing.

22. A chair comprising a seat portion, a leg portion and wheel devices mounted to a lower end of said leg portion; each of said wheel devices including a wheel having an axle, a holder member for holding said wheel, an urging member, arranged between said wheel and said holder member, for constantly urging said wheel to be projected in an operable position, and a retraction permitting member adapted to permit said wheel to be automatically retracted when a load sufficient to overcome the urging force of said urging member is exerted in the direction of gravity on a member on which said wheel is mounted, said retraction permitting member including a setting mechanism for setting said wheel to be in a retraction blocked state;

wherein said wheel devices are set to be in an operating state under a no-load condition, and are selectively set to be in either a non-operating state or an operating state under the loaded condition;

wherein the holder member includes a bearing that supports the axle of the wheel and a casing that supports the bearing; and wherein the setting mechanism is arranged within the casing and is operatively associated with the bearings so as to act on the bearing to set the wheel to be in the retraction blocked state.

23. A chair as defined in claim 22, wherein said bearing of said holder member directly supports said axle of said wheel.

24. A chair as defined in claim 23, wherein said urging member is directly disposed between said bearing and casing or substantially between said bearing and casing while another member is interposed between said bearing and casing.

25. A chair as defined in claim 23, wherein said setting mechanism includes a setting piece that acts on said bearing for said wheel so as to set between a state for permitting the retraction of said bearing and a state for blocking the retraction of said bearing, depending on the attitude of said setting piece which is set.

26. A chair as defined in claim 25, wherein said setting piece in said setting mechanism is provided on said casing above said bearing in a manner to be rotatable about a rotational axis perpendicular to said axle; and said setting piece is provided with a retraction permission and a retraction blocking protrusion in portions on a side thereof adjacent to said bearing;

whereby said setting piece is turned to change over a setting thereof so that one of said retraction permission recess and said retraction blocking protrusion is made to face the upper side of said bearing.

27. A chair as defined in claim 26, wherein said setting mechanism includes a turn range-setting mechanism provided on slide surfaces of said casing and setting piece to more reliably set the retraction permitted state and the retraction blocked state.

28. A chair as defined in claim 26, wherein the angle for turning said setting piece is 90 degrees.

29. A chair as defined in claim 26, wherein said setting piece includes a shift piece mounted on an upper end thereof at a position above said casing.

30. A chair as defined in claim 26, wherein at least one of said retraction blocking protrusion of said setting piece and said bearing that comes into contact with said retraction blocking protrusion is provided with a change-over guide portion so that said setting piece is allowed to smoothly turn even in a state where said bearing is slightly entering into said retraction permission recess of said setting piece.

31. A chair as defined in claim 30, wherein a bearing surface and a protuberance are formed on said change-over guide portion of said bearing for stably supporting said urging member.

32. A chair comprising a seat portion, a leg portion and wheel devices mounted to a lower end of said leg portion;

each of said wheel devices including a wheel having an axle, a holder member for holding said wheel, an urging member, arranged between said wheel and said holder member, for constantly urging said wheel to be projected in an operable position, and a retraction permitting member adapted to permit said wheel to be automatically retracted when a load sufficient to overcome the urging force of said urging member is exerted in the direction of gravity on a member on which said wheel is mounted, said retraction permitting member including a setting mechanism for setting said wheel to be in a retraction blocked state;

wherein said wheel devices are set to be in an operating state under a no-load condition, and are selectively set to be in either a non-operating state or an operating state under the loaded condition; and wherein said holder member is mounted in the form of a universal caster on the member on which the wheel is mounted.

\* \* \* \* \*